(12) United States Patent
Longhenry et al.

(10) Patent No.: US 9,410,255 B2
(45) Date of Patent: Aug. 9, 2016

(54) SYSTEM AND METHOD FOR GENERATING AND DISPENSING SODIUM HYDROXIDE SOLUTIONS

(71) Applicant: Tennant Company, Minneapolis, MN (US)

(72) Inventors: Daniel Paul Longhenry, Bloomington, MN (US); Daniel L. Joynt, Columbus, MN (US)

(73) Assignee: TENNANT COMPANY, Minneapolis, MN (US)

( * ) Notice: Subject to any disclaimer, the term of this patent is extended or adjusted under 35 U.S.C. 154(b) by 85 days.

(21) Appl. No.: 14/208,001

(22) Filed: Mar. 13, 2014

(65) Prior Publication Data

US 2014/0262812 A1    Sep. 18, 2014

Related U.S. Application Data

(60) Provisional application No. 61/783,623, filed on Mar. 14, 2013.

(51) Int. Cl.
| | | |
|---|---|---|
| C02F 1/46 | (2006.01) | |
| C25B 1/16 | (2006.01) | |
| C02F 1/461 | (2006.01) | |

(52) U.S. Cl.
CPC .............. C25B 1/16 (2013.01); C02F 1/4618 (2013.01); B08B 2203/0217 (2013.01); C02F 2001/4619 (2013.01); C02F 2201/46115 (2013.01)

(58) Field of Classification Search
CPC ............ C02F 1/4619; C02F 2201/46115; C02F 2001/4619; C25B 1/16; B08B 2203/0217
See application file for complete search history.

(56) References Cited

U.S. PATENT DOCUMENTS

| | | | |
|---|---|---|---|
| 1,975,361 A * | 10/1934 | Henry | A23L 1/0011 |
| | | | 134/29 |
| 4,645,595 A * | 2/1987 | Kim | A47L 15/4229 |
| | | | 210/181 |
| 5,767,056 A * | 6/1998 | Lenoir | A23L 1/0011 |
| | | | 510/272 |
| 6,168,692 B1 | 1/2001 | Sakai et al. | |
| 8,156,608 B2 * | 4/2012 | Field | A47L 11/302 |
| | | | 15/319 |
| 2012/0228145 A1 | 9/2012 | Guastella et al. | |
| 2014/0001053 A1 | 1/2014 | Longhenry et al. | |

FOREIGN PATENT DOCUMENTS

| | | |
|---|---|---|
| JP | H07265861 A | 10/1995 |
| JP | 2003145157 A | 5/2003 |
| WO | 93/16216 A1 | 8/1993 |

OTHER PUBLICATIONS

International Search Report and Written Opinion dated Jun. 4, 2014 for corresponding International Patent Application No. PCT/US2014/025331, filed Mar. 13, 2014.
David Genders: "Electrochemical Salt Splitting", Electrosynthesis, vol. 1, No. 1, Sep. 1995.

* cited by examiner

*Primary Examiner* — Arun S Phasge
(74) *Attorney, Agent, or Firm* — David D. Brush; Westman, Champlin & Koehler, P.A.

(57) ABSTRACT

A system and method for generating and dispensing a diluted sodium hydroxide solution, the system including an electrolysis unit configured to electrochemically generate a concentrated sodium hydroxide solution from an anolyte solution formed with a non-chlorinated electrolyte. The system also including a dosing pump configured to receive dilution water and the concentrated sodium hydroxide solution at a high dilution ratio to produce the diluted sodium hydroxide solution, and a dispenser configured to dispense the diluted sodium hydroxide solution.

20 Claims, 6 Drawing Sheets

SYSTEM AND METHOD FOR GENERATING AND DISPENSING SODIUM HYDROXIDE SOLUTIONS

CROSS-REFERENCE TO RELATED APPLICATION(S)

The present application claims priority to U.S. Provisional Application No. 61/783,623, entitled "SYSTEM AND METHOD FOR GENERATING AND DISPENSING SODIUM HYDROXIDE SOLUTIONS", filed on Mar. 14, 2013; the contents of which are incorporated by reference.

BACKGROUND

The present disclosure relates cleaning systems, and in particular, to cleaning systems for generating and dispensing sodium hydroxide solutions, such as with the use of electrolysis cells.

Electrolysis cells are used in a variety of different applications for changing one or more characteristics of a fluid. For example, electrolysis cells have been used in cleaning/sanitizing applications, medical industries, and semiconductor manufacturing processes. Electrolysis cells have also been used in a variety of other applications and have had different configurations. For cleaning/sanitizing applications, electrolysis cells are used to create anolyte liquids and catholyte liquid. Anolyte liquids have known sanitizing properties, and catholyte liquids have known cleaning properties.

SUMMARY

An aspect of the present disclosure is directed to a system for generating and dispensing a diluted sodium hydroxide solution. The system includes a first water line configured to receive deionized water, a second water line configured to receive dilution water, and an electrolyte line configured to receive a non-chlorinated electrolyte. The system also includes an electrolysis unit having an anode chamber and a cathode chamber separated by a barrier, where the anode chamber is configured to operably receive the deionized water from the first water line and the non-chlorinated electrolyte from the electrolyte line to form an anolyte solution in the anode chamber, and where the electrolysis unit is configured to electrochemically generate a concentrated sodium hydroxide solution in the cathode chamber from the anolyte solution in the anode chamber. The system further includes a dosing pump configured to receive the dilution water from the second water line and a portion of the concentrated sodium hydroxide solution at a high dilution ratio (e.g., at least about 100-to-1 by volume) to produce the diluted sodium hydroxide solution, and a dispenser configured to dispense the diluted sodium hydroxide solution.

Another aspect of the present disclosure is directed to a system for generating and dispensing a diluted sodium hydroxide solution, where the system includes a stationary unit and a dilution unit separate from the stationary unit. The stationary unit includes a first water line configured to receive deionized water, and an electrolysis unit having an anode chamber and a cathode chamber separated by a barrier, where the anode chamber is configured to operably receive the deionized water from the first water line and a non-chlorinated electrolyte to form an anolyte solution in the anode chamber, and where the electrolysis unit is configured to electrochemically generate a concentrated sodium hydroxide solution in the cathode chamber from the anolyte solution in the anode chamber. The stationary unit also includes a first dispenser configured to dispense the concentrated sodium hydroxide solution.

The dilution unit includes a concentrate tank configured to operably receive the concentrated sodium hydroxide solution from the first dispenser, and a second water line configured to receive dilution water. The dilution unit also includes a dosing pump configured to receive the dilution water from the second water line and a portion of the concentrated sodium hydroxide solution at a high dilution ratio (e.g., at least about 100-to-1 by volume) to produce the diluted sodium hydroxide solution, and a second dispenser configured to dispense the diluted sodium hydroxide solution.

Another aspect of the present disclosure is directed to a method for generating and dispensing diluted sodium hydroxide solution. The method includes providing an electrolysis unit having an anode chamber and a cathode chamber separated from the anode chamber by a barrier, and introducing deionized water and a non-chlorinated electrolyte to the anode chamber of the electrolysis unit to form an anolyte solution in the anode chamber. The method also includes inducing an electrical current across the electrolysis unit to electrochemically generate a concentrated sodium hydroxide solution in the cathode chamber from the anolyte solution in the anode chamber. The method further includes diluting the concentrated sodium hydroxide solution with dilution water at a high dilution ratio (e.g., at least about 100-to-1 by volume) to produce the diluted sodium hydroxide solution, and dispensing the diluted sodium hydroxide solution.

DEFINITIONS

Unless otherwise specified, the following terms as used herein have the meanings provided below:

The term "non-chlorinated electrolyte" refers to an electrolyte that is free or substantially free (i.e., less than 10 parts-per-million by weight) of chlorine atoms. Examples of non-chlorinated electrolytes include sodium bicarbonate and sodium carbonate.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "providing", such as for "providing an electrolysis unit", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

Figure 1:
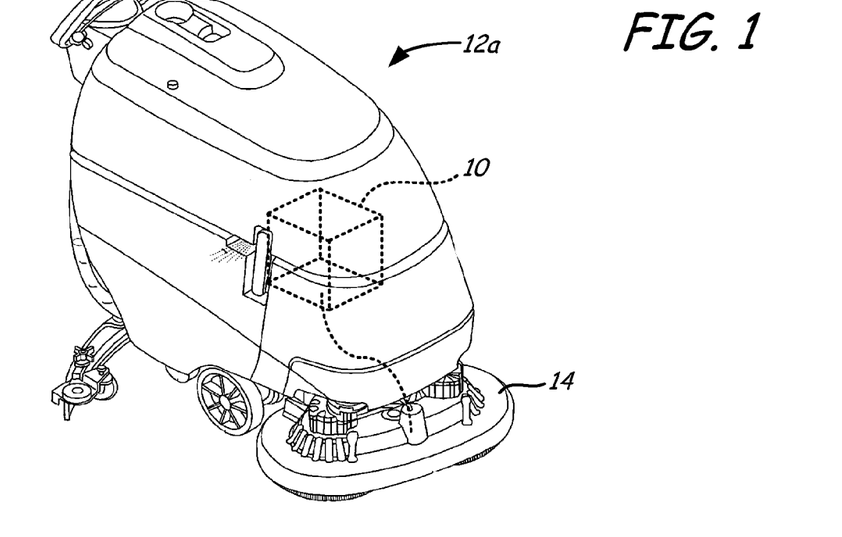
FIG. 1 is a perspective view of a mobile cleaning unit that incorporates a first-embodied solution generator of the present disclosure.

The present disclosure is directed to a solution generator that generates a concentrated sodium hydroxide (NaOH) solution. In a first embodiment, the solution generator may also include a dilution mechanism configured to dilute the concentrated sodium hydroxide solution for subsequent dispensing. For example, as shown in FIG. 1, the solution generator 10 may be an onboard component of a mobile cleaning unit 12a, which may be a mobile floor cleaner or other suitable system having a dispenser 14 for cleaning surfaces (e.g., floors). These cleaning systems are convenient in that the diluted sodium hydroxide solution may be generated and transported along with the respective cleaning systems. Examples of suitable systems for mobile cleaning unit 12a include those disclosed in Field et al., U.S. Pat. No. 8,156, 608, which may be modified to incorporate solution generator 10.

Figure 2:
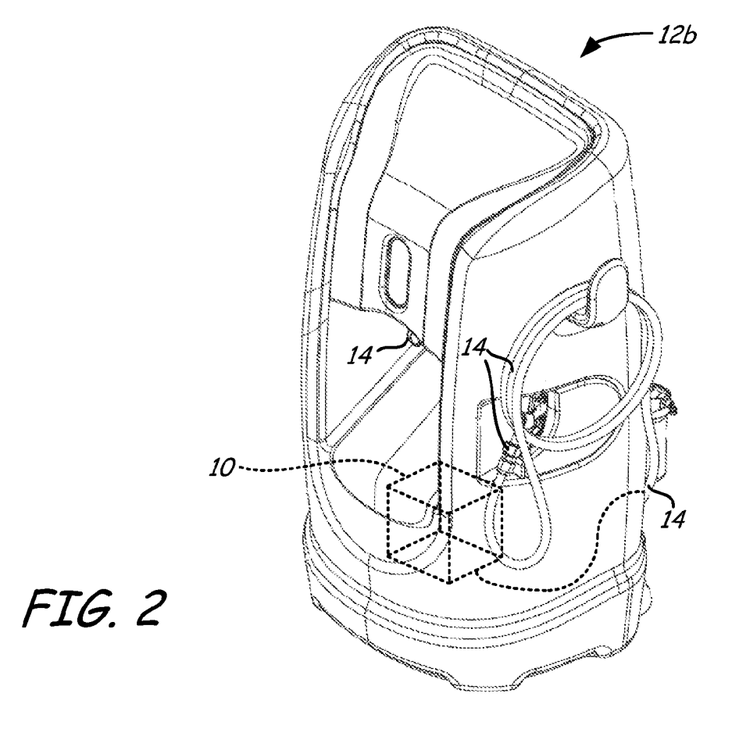
FIG. 2 is a perspective view of a stationary unit that incorporates the first-embodied solution generator.

Alternatively, as shown in FIG. 2, the solution generator 10 may be an onboard component of stationary unit 12b for filling or otherwise providing the diluted sodium hydroxide solution to other cleaning units, such as conventional mobile cleaning units. Examples systems for stationary unit 12b include those disclosed in Guastella et al., U.S. Application Publication No. 2012/0228145, which may be modified to incorporate solution generator 10.

Figure 3:
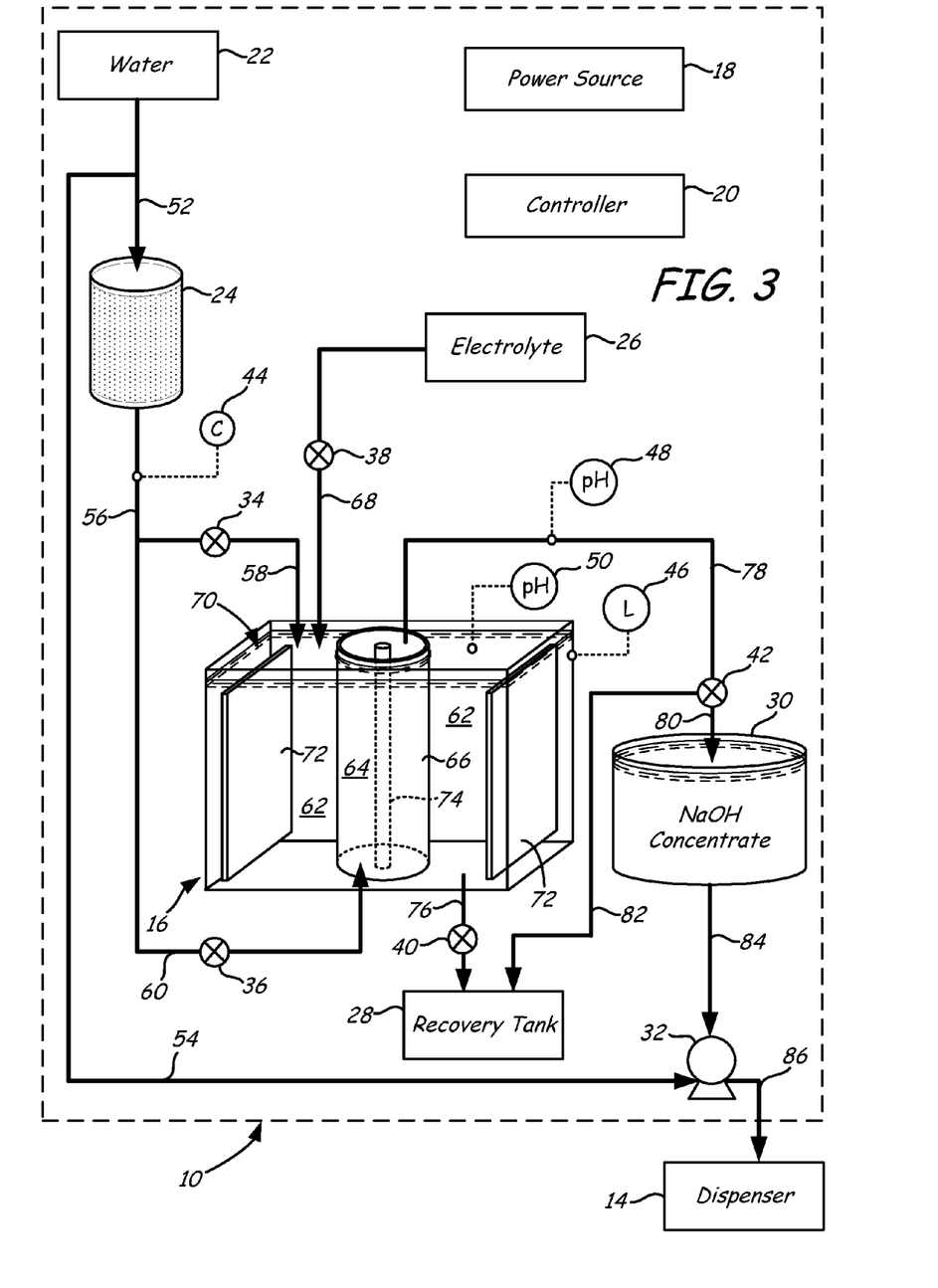
FIG. 3 is a schematic illustration of the first-embodied solution generator.

FIG. 3 illustrates an example embodiment for solution generator 10, where solution generator 10 may generate a concentrated sodium hydroxide solution, and dilute the concentrated sodium hydroxide solution for subsequent dispensing from dispenser 14. As shown, solution generator 10 includes electrolysis unit 16, where electrolysis unit 16 electrically restructures received water and an electrolyte to electrochemically generate a concentrated electrolyzed solution containing sodium hydroxide.

As discussed below, the electrolyte introduced to electrolysis unit 16 is preferably a non-chlorinated electrolyte, such as sodium bicarbonate ($NaHCO_3$) and/or sodium carbonate ($Na_2CO_3$). The use of chlorinated electrolytes, such as sodium chloride (NaCl) are good electrolytes for electrochemical processes. However, one of the byproducts of such electrochemical reactions is chlorine gas ($Cl_2$).

$$2NaCl + 2H_2O \rightarrow (2NaOH + H_2)_{catholyte} + (Cl_2)_{anolyte}$$

While the chlorine gas from this reaction may be useful in many applications, when used with cleaning units that operate in enclosed environments, such as mobile floor cleaners for residential and commercial buildings, accumulated chlorine gas may be undesirable, potentially requiring containment and subsequent disposal of the gas. As can be appreciated, containment and disposal of chlorine gas increases the efforts required to clean surfaces with such cleaning units, particularly with an on-demand generation of the cleaning solutions.

In comparison, however, solution generator 10, utilizing a non-chlorinated electrolyte, does not generate chlorine gas during the electrolysis reaction. Instead, for example, when sodium bicarbonate is used as the electrolyte, the byproducts of electrochemical reaction are carbon dioxide ($CO_2$), hydrogen ($H_2$), and oxygen ($O_2$).

$$2NaHCO_3 + 2H_2O \rightarrow (2NaOH)_{catholyte} + (2CO_2 + 2H_2 + O_2)_{anolyte}$$

The anolyte solution may also accumulate acid over time to form a buffered acidic solution. The catholyte side, however, provides a pure, highly-concentrated solution of sodium hydroxide in water.

As discussed below, because the sodium hydroxide solution on the catholyte side is highly concentrated, it can be subsequently diluted at a high dilution ratio (e.g., at a 500-to-1 volumetric ratio) for dispensing as a cleaning solution. As such, only a small amount of the sodium hydroxide solution needs to be generated to produce a large volume of dispensed cleaning solution. This allows solution generator 10 to be used in small-scale environments, such as an onboard component of a mobile cleaning unit 12a or a stationary unit 12b, for example.

In the shown embodiment, solution generator 10 also includes power source 18, controller 20, water source 22, deionizing cartridge 24, electrolyte source 26, recovery tank 28, concentrate tank 30, and dosing pump 32. Solution generator 10 may also include one or more housing structures for retaining the components of solution generator 10, where the housing structure(s) may also function as a structure component of mobile cleaning unit 12a or stationary unit 12b.

Power source 18 is one or more external and/or internal power sources configured to provide electrical power to one or more of electrolysis unit 16, controller 20, dosing pump 32, and the various sensors and valves of solution generator 10, via one or more electrical lines (not shown). For example, power supply 16 may connect to one or more valve control units (e.g., for valves 34, 36, 38, 40, and 42), and/or one or more sensors (e.g., conductivity sensor 44, level sensor 46, and pH sensors 48 and 50).

The particular type of power source 18 may vary depending on where solution generator 10 resides. For example, when used as an onboard component of a mobile cleaning unit 12a, power source 18 may be one or more batteries, an alternator (e.g., for use with an internal combustion engine), an external power line, and/or other generator of mobile cleaning unit 12a. In this embodiment, solution generator 10 preferably generates the concentrated sodium hydroxide solution when mobile cleaning unit 12a is idle and recharging its batteries. This preserves the battery life of mobile cleaning unit 12a during use, and allows a sufficient amount of the concentrated sodium hydroxide solution to be pre-generated for subsequent use.

However, if desired, solution generator 10 may also generate the concentrated sodium hydroxide solution while mobile cleaning unit 12a is being operated to clean a surface. In this embodiment, solution generator 10 may be powered by the batteries, by an alternator or other generator of mobile cleaning unit 12a, and/or by an external power line (e.g., if mobile cleaning unit 12a is plugged in while being operated), for example.

Alternatively, in embodiments in which solution generator 10 is a component of a stationary unit 12b, power source 18 may be one or more batteries, or more preferably, an external power line coupled to the stationary unit 12b.

Controller 20 is one or more control circuits configured to monitor and operate the components of solution generator 10 over one or more power and communication lines (e.g., electrical, optical, and/or wireless lines, not shown). For example, controller 20 may electronically control one or more valve control units (e.g., for valves 34, 36, 38, 40, and 42), and receive measurement signals from one or more sensors (e.g., conductivity sensor 44, level sensor 46, and pH sensors 48 and 50), for controlling operation of solution generator 10 with one or more process control loops. Controller 20 may also optionally direct operations of other components of mobile cleaning unit 12a and/or stationary unit 12b.

One or more of the control functions performed by controller 20 can be implemented in hardware, software, firmware, etc., or a combination thereof. Such software, firmware, etc. may stored on a non-transitory computer-readable medium, such as a memory device. Any computer-readable memory device can be used with controller 20, such as a disc drive, a solid state drive, CD-ROM, DVD, flash memory, RAM, ROM, a set of registers on an integrated circuit, etc. For example, controller 20 can be implemented partly or completely in a programmable logic controller and/or a processing device such as a microcontroller and/or other processor that executes instructions stored in a memory device, where the instructions are configured to perform the steps of the control process when executed by the processor device to convert the processing device into a special purpose computer.

Water source 22 is a source of tap (or deionized) water for solution generator 10, and may be a fillable, onboard, reservoir tank for transporting the water (e.g., in a mobile cleaning unit 12a) or an external water line coupled to solution generator 10 (e.g., in a stationary unit 12b). Water source 22 is coupled to deionizing cartridge 24 via water line 52, and to dosing pump 32 via dilution line 54, where deionizing cartridge 24 is one or more cartridges configured to remove hardness from tap water delivered to electrolysis unit 16. This treatment of the tap water reduces the risk of membrane/separator plugging and electrode scaling in electrolysis unit 16.

Because dispenser 32 only requires a small amount of the concentrated sodium hydroxide solution (due to the high dilution ratio), electrolysis unit 16 only requires a small amount of water to operate (e.g., 1 liter per 500 liters of dispensed solution). This allows deionizing cartridge 24 to be a practical solution for deionizing the incoming water.

For example, typical mixed-bed deionizing cartridges are capable of treating from about 270 to about 700 grains of minerals, where very hard water typically contains about 30 grains of minerals per gallon (3.9 liters) of water. Thus, each deionizing cartridge 24 is preferably capable of treating from about 9 gallons (about 35 liters) to about 23 gallons (about 90 liters) of water to be delivered to electrolysis unit 16 prior to requiring replacement.

In comparison, due to the high level of dilution at dosing pump 32 (e.g., about 500-to-1 dilution ratio), this produces from about 4,375 gallons (about 17,500 liters) to about 11,250 gallons (about 45,000 liters) of the diluted sodium hydroxide solution per deionizing cartridge 24. For a mobile cleaning unit 12a having a solution dispensing rate of about 0.25 gallons/minute (about 0.97 liters/minute), which is typical for high-end mobile floor cleaners, this corresponds from about 300 to about 750 hours of cleaning operation. Therefore, as can be appreciated, deionizing cartridge 24 is particularly suitable for use in embodiments in which solution generator 10 is an onboard component of a mobile cleaning unit 12a (e.g., a mobile floor cleaner). Preferably, deionizing cartridge 24 is removable and replaceable with a fresh deionizing cartridge 24 when the current deionizing cartridge 24 exhausts its useful life.

Deionizing cartridge 24 is coupled to electrolysis unit 16 via water line 56, which may branch into water lines 58 and 60, where water lines 58 and 60 may respectively include valves 34 and 36. Deionizing cartridge 24 is preferably used in conjunction with conductivity sensor 44, which monitors the conductivity of the treated water flowing through water line 56. This allows controller 20 to identify when deionizing cartridge 24 is close to expiring.

For example, controller 20 may monitor conductivity signals from conductivity sensor 44 and identify when the conductivity levels of the treated water flowing through water line 56 rise above a threshold conductivity level. Controller 20 may then close valves 34 and 36 (and optionally close valves 38 and 40), and disable operation of electrolysis unit 16. Controller 20 may also generate a visual and/or audible message to inform a user that deionizing cartridge 24 requires replacement.

In alternative embodiments, such as when functioning as a stationary unit 12b, for example, deionizing cartridge 24 may be replaced with a water softener to treat the water prior to entering electrolysis unit 16. However, water softeners typically have larger space and power requirements compared to deionizing cartridge 24. Furthermore, because water softeners generate soft ions in the softened water, it can be difficult to sense when the softening electrolyte (e.g., salt) requires replacement.

In further alternative embodiments, water source 22 may provide distilled water to electrolysis unit 16 rather than standard tap water. In this embodiment, deionizing cartridge 24 may be omitted, and conductivity sensor 44 may monitor the conductivity of the water exiting water source 22 in the same manner as discussed above.

In comparison to the water directed to electrolysis unit 16, the water directed to dosing pump 32 via dilution line 54 preferably does not pass through deionizing cartridge 24. This prevents deionizing cartridge 24 from having to treat the relatively large amount of dilution water, and limits the treatment to the smaller amount of water delivered to electrolysis unit 16 (e.g., about 500 times less). As can be appreciated, this preserves deionizing cartridge 24 for extended periods of operation in solution generator 10, and is attainable due to the high concentration of sodium hydroxide produced by electrolysis unit 16, which itself is attainable in the small-scale environments of residential and commercial locations due to the elimination of chlorine gas generation, as discussed above.

The treated water flowing through water line 58 is delivered to an anode chamber 62 of electrolysis unit 16, and the water flowing through water line 60 is delivered to a cathode chamber 64 of electrolysis unit 16 (for startup purposes), where anode chamber 62 and cathode chamber 64 are preferably separated by barrier 66. In the shown embodiment, electrolysis unit 16 has a core-shell arrangement around barrier 66, where anode chamber 62 functions as the shell side, and cathode chamber 64 functions as the core side. However, electrolysis unit 16 may alternatively have another suitable arrangement, such as anode chamber 62 and cathode chamber 64 being located on opposing lateral sides of barrier 66.

Barrier 66 is one or more separators configured to allow transmission of sodium ions and water, but otherwise blocks the transmission of other compounds and ions. Examples of suitable separators for barrier 66 include ion exchange membranes or other suitable diaphragms. The particular type of separator for barrier 66 may vary depending on the particular sodium hydroxide concentration required. For example, ion exchange membranes can produce very high sodium hydroxide concentrations in cathode chamber 64, such as up to about 35% by volume in water, when no extra feed water is delivered to cathode chamber 64 via water line 60.

Alternatively, lower-cost and less efficient separators may be used to produce sodium hydroxide concentrations that are lower than those attainable with ion exchange membranes, but are still high concentrations, such as up to about 10% by volume in water, for example. In comparison to these sodium hydroxide concentrations, standard cleaning solutions typically have sodium hydroxide concentrations in water of about 200 parts-per-million (ppm) by volume. This corresponds to a 500-to-1 dilution ratio for a 10% by volume concentrated solution. In other words, 1 liter of a 10% by volume solution of sodium hydroxide in water may be blended with 500 liters of tap water from dilution line 54 to produce a cleaning solution having a sodium hydroxide concentration in water of about 200 ppm by volume.

As further shown, an electrolyte may also be metered into anode chamber 62 of electrolysis unit 16 from electrolyte source 26 via electrolyte line 68. As discussed above, the electrolyte provided to electrolysis unit 16 is preferably a non-chlorinated electrolyte, as defined above, and that also preferably includes sodium atoms. Examples of suitable non-chlorinated electrolytes that may be supplied from electrolyte source 26 include sodium bicarbonate and/or sodium carbonate, as discussed above.

Valve 38 is preferably a metering valve located along electrolyte line 38, allowing controller 20 to meter appropriate amounts of the non-chlorinated electrolyte through electrolyte line 68. In one embodiment, as shown, electrolyte line 68 may directly dispense the non-chlorinated electrolyte directly into anode chamber 62, where it may then dissolve in the treated water from water line 58 to preferably form a saturated anolyte solution of the non-chlorinated electrolyte in the treated water.

Alternatively, water line 58 and electrolyte line 68 may converge at a pre-mixing unit (not shown) prior to reaching anode chamber 62. In this situation, the non-chlorinated electrolyte may dissolve in the treated water from water 58 to form a saturated anolyte solution prior to being dispensed into anode chamber 62. In either case, the dispensed non-chlorinated electrolyte and treated water may create an anolyte bath 70 of the anolyte solution in anode chamber 62, as shown, where barrier 66 preferably resides in anolyte bath 70 in a sealed manner to separate cathode chamber 64 from anolyte bath 70.

Electrolysis unit 16 also includes one or more anode electrodes 72 and one or more cathode electrodes 74 (a single cathode electrode 74 is shown in FIG. 1). Anode electrodes 72 are located in anode chamber 62 and are preferably connected to power source 18, such as through controller 20. Correspondingly, cathode electrode 74 is located in cathode chamber 64 and is preferably connected to power source 18, such as through controller 20.

As further shown, anode chamber 62 is coupled to recovery tank 28 via recovery line 76, which includes valve 40. On the core side, cathode chamber 64 directs the catholyte stream to concentrate tank 30 via catholyte lines 78 and 80, where valve 42 is preferably a diverging valve configured to direct the catholyte stream to either catholyte line 80 (and to concentrate tank 30) or to recovery tank 28 via recovery line 82.

Prior to operation, controller may close valve 40 and set valve 42 to direct flows to recovery tank 28. This prevents any startup catholyte streams from diluting any existing concentrated sodium hydroxide solution in concentrate tank 30. Controller 20 may then open valve 36 to fill cathode chamber 64 with the treated water from water line 60. After cathode chamber 64 is filled, controller 60 preferably closes valve 60 to prevent further filling unless a more dilute sodium hydroxide solution is desired, in which case valve 60 may be set to allow the treated water to continue to flow into cathode chamber 64, preferably at a low flow rate.

Controller 20 may also open valves 34 and 38 to fill anode chamber 62 with the treated water from water line 58 and the non-chlorinated electrolyte from electrolyte line 68 to form anolyte bath 70 in anode chamber 62. Anode chamber 62 may also include one or more level sensors 46 configured to measure the height of anolyte bath 70 in anode chamber 62 to prevent underfilling and overfilling. As such, when anolyte bath 70 reaches a set height or range in anode chamber 62, level sensor 46 may signal controller 20 to close valves 34 and 38 to prevent overfilling. In an alternative embodiment, anode chamber 62 may include a spill-over weir configured to collect any overfilled amounts of anolyte bath 70, which may then be recycled back into anode chamber via a separate recirculation line and pump (not shown).

During operation, controller 20 may apply a voltage to anode electrodes 72 and cathode electrode 74, inducing an electrical current across electrolysis unit 16 to generate a catholyte stream containing the concentrated sodium hydroxide solution, as discussed above. In particular, water molecules and sodium ions generated in anolyte bath 70 may pass through barrier 66 into cathode chamber 64 to generate the concentrated sodium hydroxide solution. This solution may then flow through catholyte line 78 as the catholyte stream.

During an initial period of operation after startup, the volume of treated water in cathode chamber 64, while necessary for starting the electrolysis reaction, can undesirably dilute the initially generated sodium hydroxide. In this case, the initial amount of the generated sodium hydroxide solution can be directed to recovery tank 28 via recovery line 82. As mentioned above, this reduces the risk of diluting any existing concentrated sodium hydroxide solution residing in concentrate tank 30.

Controller 20 may monitor the pH of the sodium hydroxide solution flowing through catholyte line 78 with pH sensor 48 or other suitable sensor. When the concentration of the sodium hydroxide in the catholyte stream reaches an acceptable level, as indicated by pH sensor 48, controller 20 may set valve 42 to direct the catholyte stream to concentrate tank 30 (i.e., close off recovery line 82). This delivers the pure, highly-concentrated solution of sodium hydroxide to concentrate tank 30.

At anode chamber 62, the electrolysis reaction generates hydrogen, oxygen, and carbon dioxide, which may be vented as needed. Additionally, as mentioned above, the electrolysis reaction may also generate acids, which may accumulate over time to form a buffered acidic solution in anolyte bath 70. Controller 20 may monitor the acid levels in anolyte bath 70 with pH sensor 50. When the acid levels in anolyte bath 70 fall below a set pH threshold, controller 20 may open valve 40 to drain a portion of anolyte bath 70 into recovery tank 28 via recovery line 76. Controller 20 may also open valves 34 and 38 to introduce fresh amounts of the treated water from water line 58 and the non-chlorinated electrolyte from electrolyte line 68.

This replenishing of anolyte bath 70 in anode chamber 62 may be performed in a metered, incremental manner or a batch manner, such as when the pH acid levels in anolyte bath 70 fall below a set pH threshold. Alternatively, the replenishing of anolyte bath 70 may be performed in a continuous manner, where the drained and replenished amounts are slowly removed and introduced, respectively. In this continuous embodiment, controller 20 may adjust the flow rates to maintain a pH of anolyte bath 70 within a set pH range to substantially attain steady-state flows.

Controller 20 may also monitor the electrical current induced across electrolysis unit 16. In particular, controller 20 may, for example, measure fluctuations in the electrical current induced across electrolysis unit 16 with a current sensor (not shown). In this embodiment, controller 20 may adjust the flow rate of the treated water (via valve 34) and/or the non-chlorinated electrolyte (via valve 38) into anode chamber 62, and the flow rate of anolyte bath 70 drained to recovery tank 28 (via valve 40), based on the measured electrical currents.

Additionally, controller 20 may adjust the voltage applied to electrolysis unit 16. These adjustments assist in ensuring that the mixed solution flowing to electrolysis unit 16 has a consistent and controlled electrolyte concentration and relatively low acid levels, allowing electrolysis unit 16 to generate a high-quality, concentrated sodium hydroxide solution in cathode chamber 64 with controlled compositional properties.

Concentrate tank 30 is a reservoir for collecting the concentrated sodium hydroxide solution generated in cathode chamber 64. In some embodiments, concentrate tank 30 may also include one or more level sensors (not shown) and one or more pH sensors (not shown) for monitoring the retained concentrated sodium hydroxide solution.

When dispensing is desired, such as by user activation, controller 20 may direct dosing pump 32 to draw preset volumes of the concentrated sodium hydroxide solution from concentrate tank 30 (via concentrate line 84) and tap water from dilution line 54 to dilute the concentrated sodium hydroxide solution to form a diluted sodium hydroxide solution. The diluted sodium hydroxide solution may then flow to dispenser 14 via diluted line 86, where it may be dispensed as needed, such as to function as a cleaning solution.

The preset dilution levels at dosing pump 32 may be set by controller 20 and/or may be user selectable (e.g., with a user control panel, not shown). Examples of preferred dilution ratios during standard operation include dilution ratios of at least about 100-to-1 by volume, more preferably at least about 250-to-1 by volume, and even more preferably at least about 450-to-1. In some embodiments, the dilution ratio is at least about 500-to-1 by volume. In other embodiments, the dilution ratio is at least about 750-to-1 by volume. In further embodiments, the dilution ratio is at least about 1,000-to-1 by volume. Additionally, in some embodiments, a user may select a "boost" mode, where controller 20 reduces the dilution level for a given period of time to dispense a diluted solution with a higher sodium hydroxide concentration (e.g., about 400 ppm by volume).

Dispenser 14 may include any suitable mechanism for dispensing the diluted solution, and may also include additional features, such as scrubbing devices. For example, when solution generator 10 is used as an onboard component of a mobile floor cleaner, such as mobile cleaning unit 12a, dispenser 14 may include dispensing jets for dispensing the diluted solution to a floor surface at one or more flow rates (e.g., from about 0.1 gallons/minute (0.4 liters/minute) to about 0.25 gallons/minute (about 0.97 liters/minute)), one or more scrubbing devices for scrubbing the floor surface with the diluted solution, and one or more recovery lines for drawing the scrubbed solution back to recovery tank 28.

Alternatively, when solution generator 10 is an onboard component of a stationary unit, such as stationary unit 12b, dispenser 14 may include one or more dispensing nozzles for dispensing the diluted solution into a conventional mobile cleaning unit. For example, the dispensing nozzles of dispenser 14 may dispense the diluted solution at different flow rates depending on the size of the receiving mobile cleaning unit.

As can be appreciated from the above discussion, solution generator 10 is suitable for generating pure, highly-concentrated solutions of sodium hydroxide in water. This allows high dilution ratios to be achieved for producing cleaning solutions, which correspondingly allows small volumes of the concentrated sodium hydroxide solutions to be generated. This in turn allows deionizing cartridges to be practical for deionizing incoming tap water for extended periods of operation. These features, combined with the elimination of chlorine gas, allows solution generator 10 to be used in small-scale environments, such as in mobile cleaning units 12a and stationary units 12b for use in residential and commercial buildings.

Figure 4:
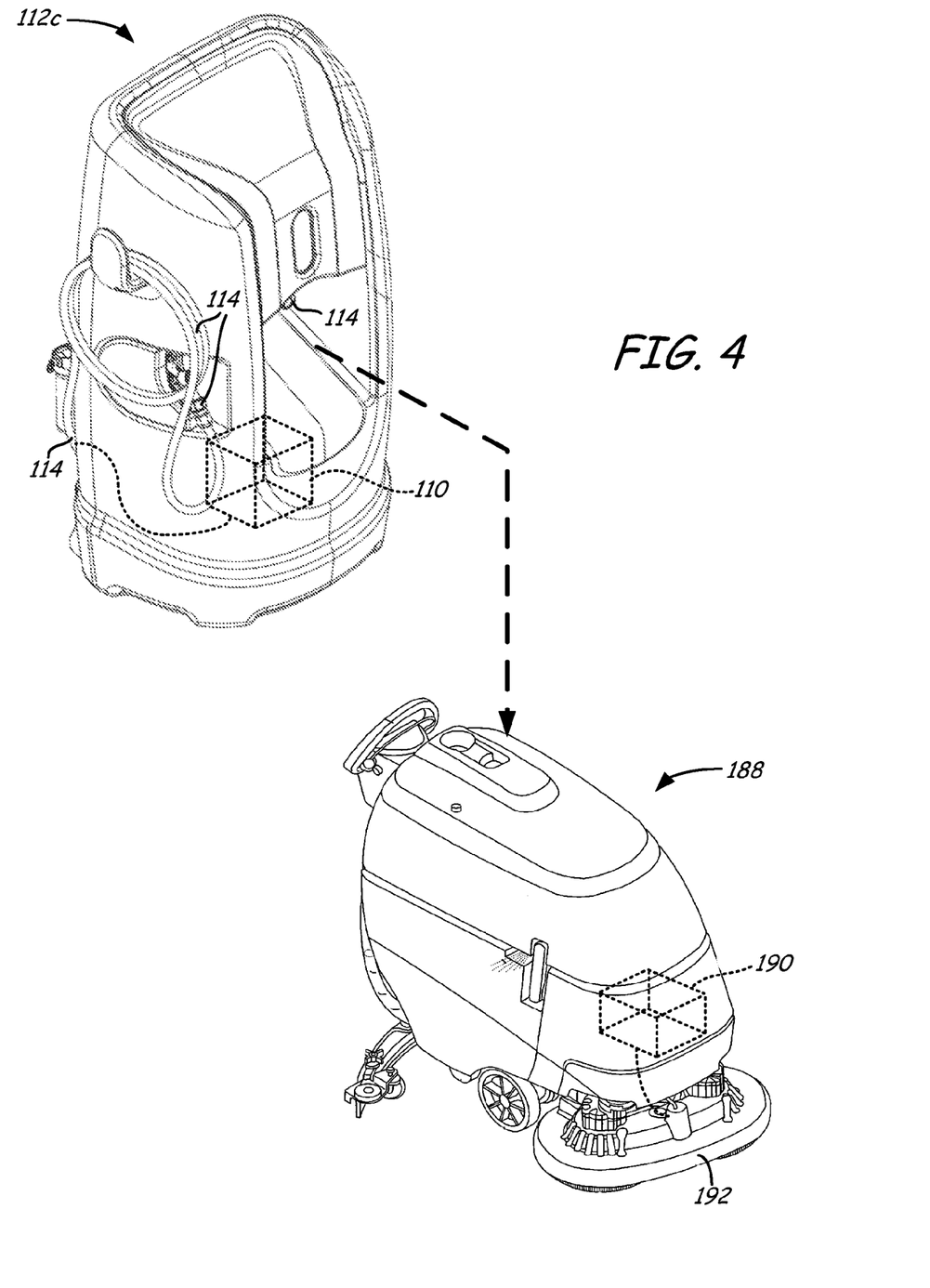
FIG. 4 is a perspective view of a stationary unit and a mobile cleaning unit that incorporate a second-embodied solution generator and dilution unit of the present disclosure.

FIGS. 4-7 illustrate a second embodiment in which the solution generator (referred to as solution generator 110) is configured to produce the concentrated sodium hydroxide solution for dispensing (i.e., in an non-diluted state). For example, as shown in FIG. 4, solution generator 110 may be an onboard component of stationary unit 112c. In this embodiment, solution generator 110 may generate the concentrated sodium hydroxide solution, which may be dispensed from one or more dispensers 114 into one or more mobile cleaning units 188. Each mobile cleaning unit 188 preferably includes its own dilution unit 190 for diluting the received concentrated sodium hydroxide solution, and dispenser 192 for dispensing the diluted solution as discussed above for mobile cleaning unit 12a (shown in FIG. 1).

Figure 5:
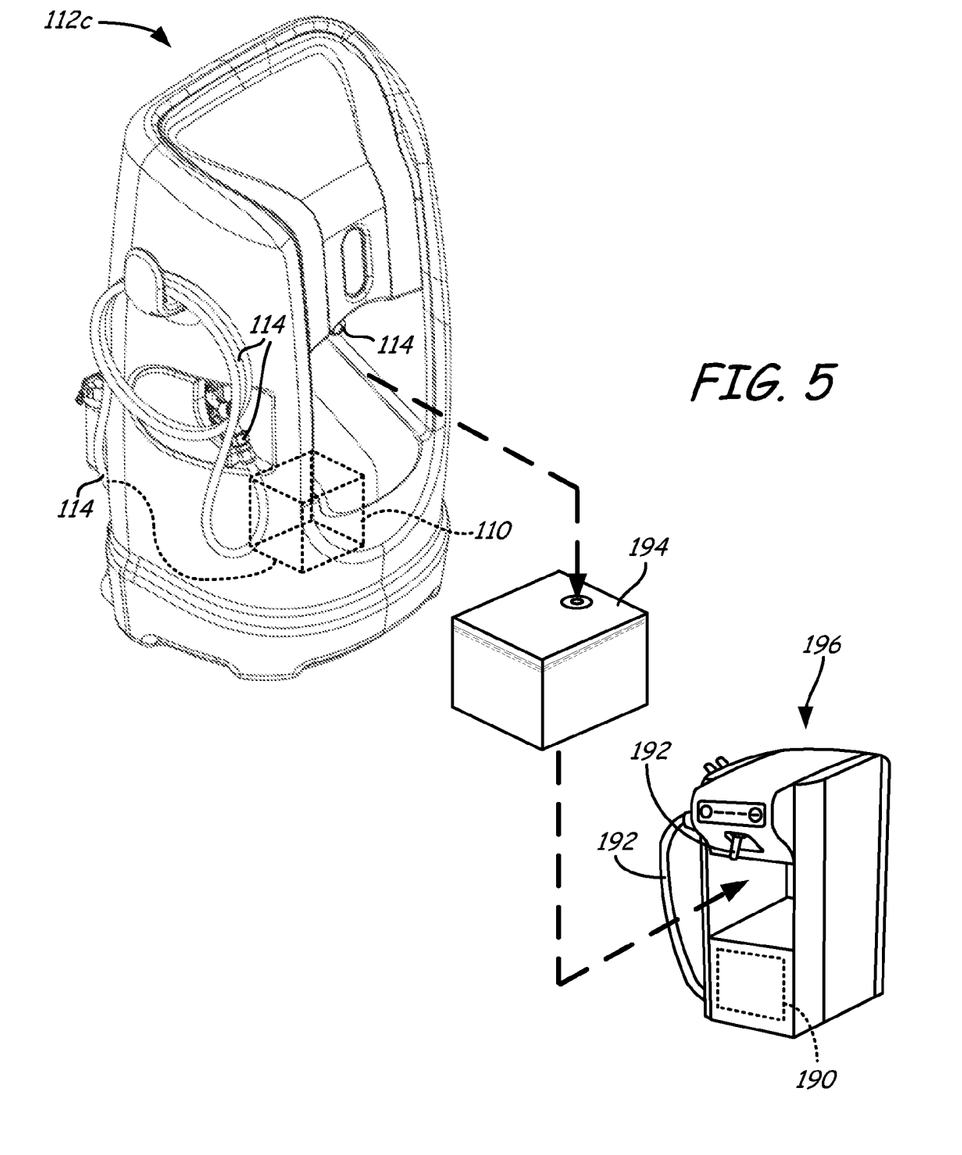
FIG. 5 is a perspective view of a stationary unit and a remote dilution unit that incorporate the second-embodied solution generator and dilution unit.

Alternatively, as shown in FIG. 5, the concentrated sodium hydroxide solution may be dispensed into one or more intermediary containers 194 for delivery to one or more remote dilution stations 196, where each remote dilution station 196 preferably includes dilution unit 190 and one or more dispensers 192. In this embodiment, each remote dilution station 196 may dilute the concentrated sodium hydroxide solution (at dilution unit 190) and dispense the diluted solution from dispenser(s) 192 into conventional mobile cleaning units as discussed above for stationary unit 12b (shown in FIG. 2). Examples of suitable systems for stationary unit 112c, intermediary containers 194, and remote dilution stations 196 include those disclosed in Longhenry et al., U.S. Application Publication No. 2014/0001053, which may be modified to incorporate solution generator 110 and dilution unit 190.

Figure 6:
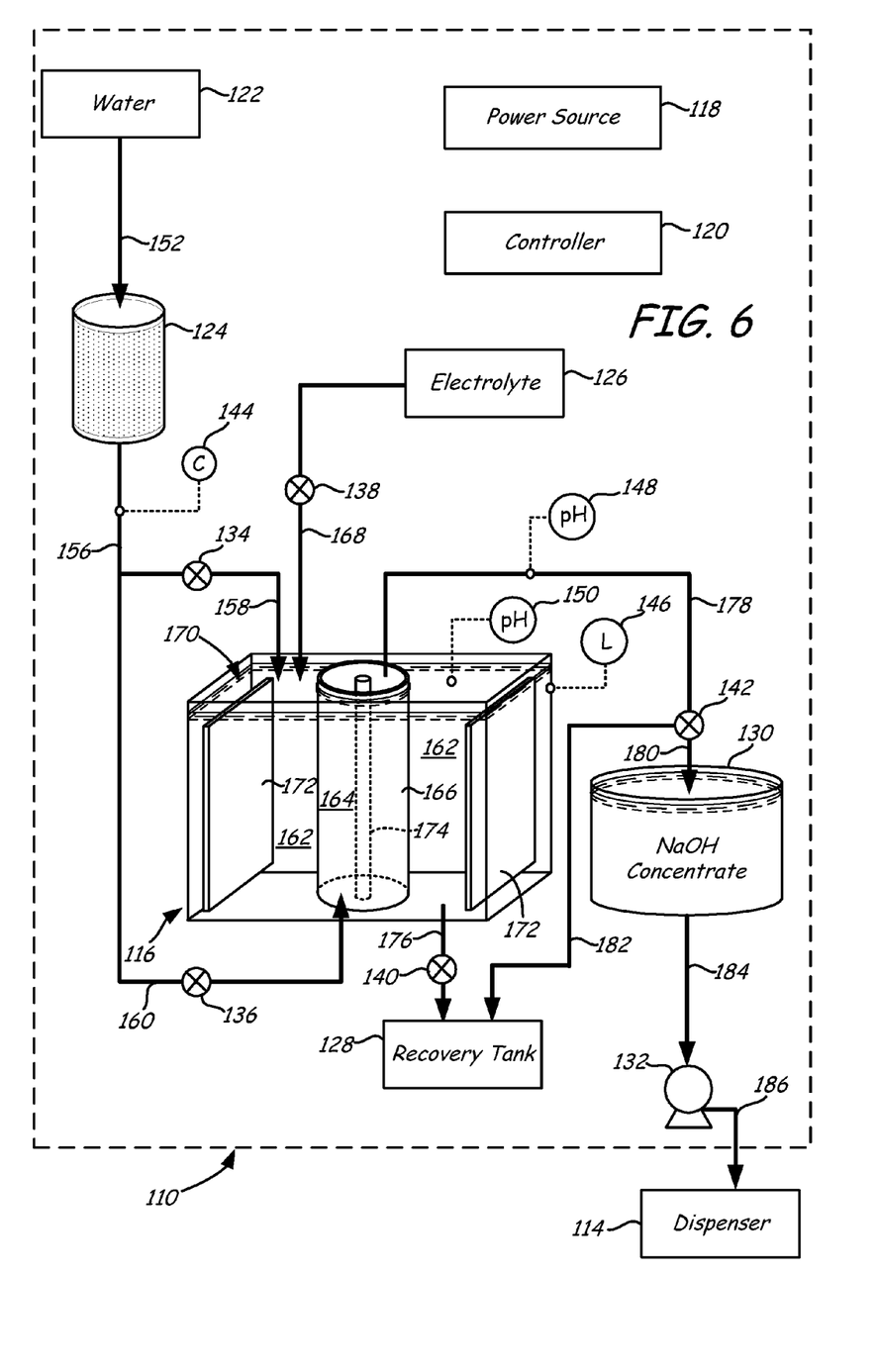
FIG. 6 is a schematic illustration of the second-embodied solution generator.
Figure 7:
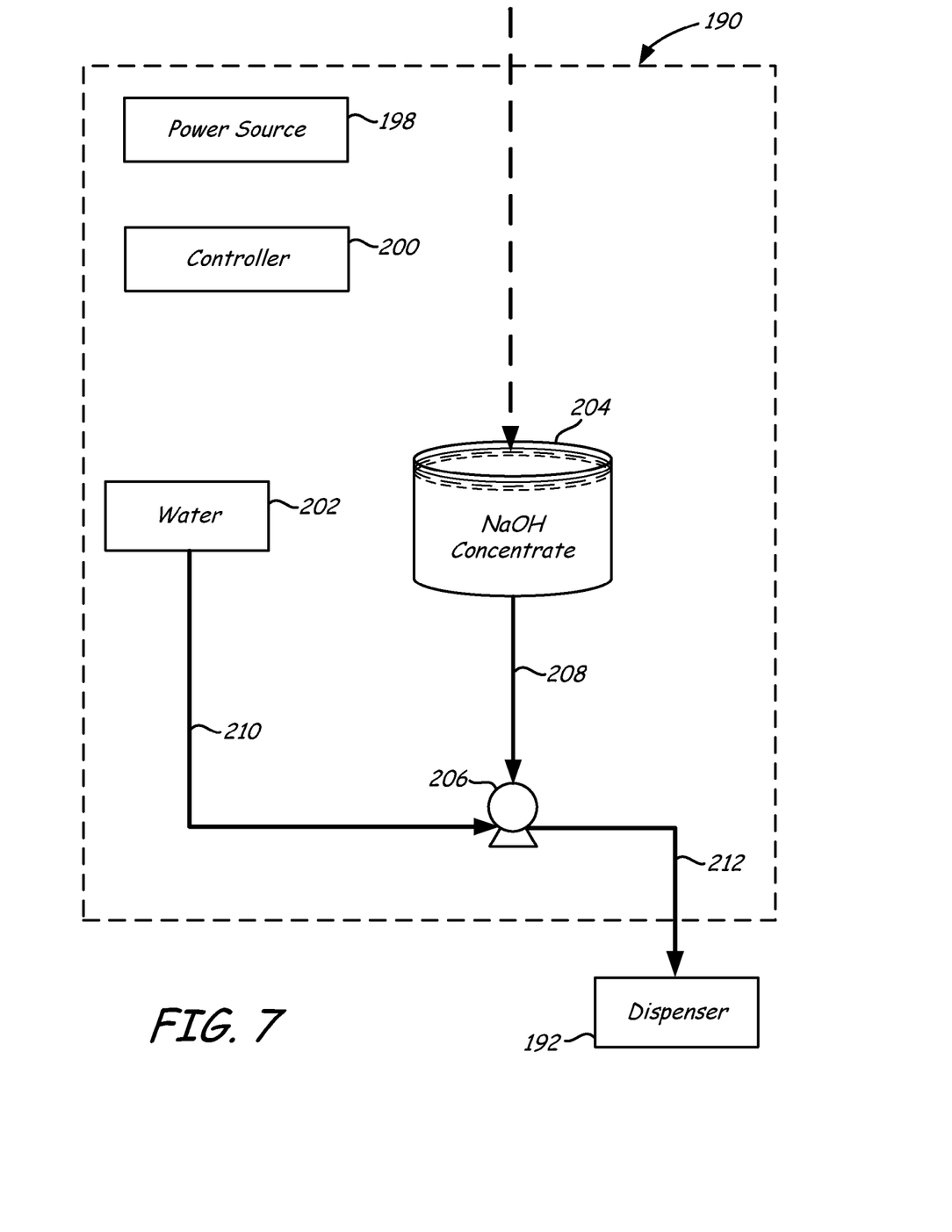
FIG. 7 is a schematic illustration of the dilution unit for use with the second-embodied solution generator.

FIGS. 6 and 7 respectively illustrate example embodiments for solution generator 110 and dispenser 114 (shown in FIG. 6), and dilution unit 190 and dispenser 192 (shown in FIG. 7). As shown in FIG. 6, solution generator 110 may function in a similar manner to solution generator 10, where corresponding reference numbers are increased by "100" from those of solution generator 10. However, with solution generator 110, dilution line 54 may be omitted, and dosing pump 32 and diluted line 86 may be replaced with dispensing pump 130 and dispensing line 186. As such, dispensing pump 132, dispensing line 186, and dispenser 114 are configured to dispense the concentrated sodium hydroxide solution from concentrate tank 130 to fill separate units, such as mobile cleaning unit 188 and/or intermediary containers 194/remote dilution stations 196.

As shown in FIG. 7, dilution unit 190 may include power source 198, controller 200, water source 202, concentrate tank 204, and dosing pump 206, which may function in a similar manner to power source 18, controller 20, water source 22, concentrate tank 30, and dosing pump 32 of solution generator 10 (shown in FIG. 3). Accordingly, concentrate tank 30 is a reservoir configured to receive the concentrated sodium hydroxide solution from stationary unit 112c (either directly or via intermediary containers 194).

When dispensing from dispenser 192 is desired, such as by user activation, controller 200 may direct dosing pump 206 to draw the concentrated sodium hydroxide solution from concentrate tank 204 (via concentrate line 208) and tap water from water source 202 (via dilution line 210) to dilute the concentrated sodium hydroxide solution to form a diluted sodium hydroxide solution. The diluted sodium hydroxide solution may then flow to dispenser 192 via diluted line 212, where it may be dispensed as needed, such as to function as a cleaning solution, as discussed above.

The preset dilution levels at dosing pump 206 may also be set by controller 200 and/or may be user selectable (e.g., with a user control panel, not shown), and examples of preferred dilution ratios include those discussed above for solution generator 10. Additionally, in some embodiments, a user may also select a "boost" mode, where controller 200 reduces the dilution level for a given period of time to dispense a diluted solution with a higher sodium hydroxide concentration (e.g., about 400 ppm by volume).

Accordingly, solution generator 110 and dilution unit 190 provide an alternative mechanism for generating pure, highly-concentrated solutions of sodium hydroxide in water, where the concentrated sodium hydroxide solution is diluted and dispensed at one or more remote locations from where it is generated. This also allows high dilution ratios to be achieved for producing cleaning solutions, which correspondingly allows small volumes of the concentrated sodium hydroxide solutions to be generated. This in turn allows deionizing cartridges to be practical for deionizing incoming tap water for extended periods of operation. These features, combined with the elimination of chlorine gas, allows solution generator 110 to be used in small-scale environments, such as stationary unit 112c, for use in residential and commercial buildings.

Although the present disclosure has been described with reference to preferred embodiments, workers skilled in the art will recognize that changes may be made in form and detail without departing from the spirit and scope of the disclosure.

The invention claimed is:

1. A system for generating and dispensing a diluted sodium hydroxide solution, the system comprising:
   a deionizing unit configured to deionized water;
   a first water line configured to receive the deionized water from the deionizing unit;
   a second water line configured to receive dilution water;
   an electrolyte line configured to receive a non-chlorinated electrolyte;
   an electrolysis unit having an anode chamber and a cathode chamber separated by a barrier, wherein the anode chamber is configured to operably receive the deionized water from the first water line and the non-chlorinated electrolyte from the electrolyte line to form an anolyte solution in the anode chamber, and wherein the electrolysis unit is configured to electrochemically generate a concentrated sodium hydroxide solution in the cathode chamber from the anolyte solution in the anode chamber;
   a dosing pump configured to receive the dilution water from the second water line and a portion of the concentrated sodium hydroxide solution at a dilution ratio of at least about 100-to-1 by volume to produce the diluted sodium hydroxide solution; and
   a dispenser configured to dispense the diluted sodium hydroxide solution.

2. The system of claim 1, wherein the deionizing unit comprises a deionizing cartridge.

3. The system of claim 2, wherein the second water line does not receive the dilution water from the deionizing cartridge.

4. The system of claim 1, wherein the system is selected from the group consisting of a mobile cleaning unit, a stationary unit, and combinations thereof.

5. The system of claim 1, and further comprising a concentrate tank configured to operably receive the concentrated sodium hydroxide solution from the cathode chamber, and to direct the portion of the concentrated sodium hydroxide solution to the dosing pump.

6. The system of claim 1, wherein the dilution ratio is at least about 250-to-1 by volume.

7. The system of claim 6, wherein the dilution ratio is at least about 450-to-1 by volume.

8. The system of claim 1, wherein the non-chlorinated electrolyte is selected from the group consisting of sodium bicarbonate, sodium carbonate, and combinations thereof.

9. A system for generating and dispensing a diluted sodium hydroxide solution, the system comprising:
   a stationary unit comprising:
      a first water line configured to receive deionized water;
      an electrolysis unit having an anode chamber and a cathode chamber separated by a barrier, wherein the anode chamber is configured to operably receive the deionized water from the first water line and a non-chlorinated electrolyte to form an anolyte solution in the anode chamber, and wherein the electrolysis unit is configured to electrochemically generate a concentrated sodium hydroxide solution in the cathode chamber from the anolyte solution in the anode chamber; and
      a first dispenser configured to dispense the concentrated sodium hydroxide solution; and
   a dilution unit separate from the stationary unit, the dilution comprising:
      a concentrate tank configured to operably receive the concentrated sodium hydroxide solution from the first dispenser;
      a second water line configured to receive dilution water;
      a dosing pump configured to receive the dilution water from the second water line and a portion of the concentrated sodium hydroxide solution at a dilution ratio of at least about 100-to-1 by volume to produce the diluted sodium hydroxide solution; and
      a second dispenser configured to dispense the diluted sodium hydroxide solution.

10. The system of claim 9, and further comprising a deionizing cartridge, wherein the first water line is configured to receive the deionized water from the deionizing cartridge.

11. The system of claim 9, wherein dilution unit is a component of a mobile cleaning unit.

12. The system of claim 9, wherein the dilution unit is a component of a dilution station that is remote from the stationary unit.

13. The system of claim 9, wherein the dilution ratio is at least about 250-to-1 by volume.

14. The system of claim 13, wherein the dilution ratio is at least about 450-to-1 by volume.

15. The system of claim 9, wherein the non-chlorinated electrolyte is selected from the group consisting of sodium bicarbonate, sodium carbonate, and combinations thereof.

16. A method for generating and dispensing diluted sodium hydroxide solution, the method comprising:
- providing an electrolysis unit having an anode chamber and a cathode chamber separated from the anode chamber by a barrier;
- introducing deionized water and a non-chlorinated electrolyte to the anode chamber of the electrolysis unit to form an anolyte solution in the anode chamber;
- inducing an electrical current across the electrolysis unit to electrochemically generate a concentrated sodium hydroxide solution in the cathode chamber from the anolyte solution in the anode chamber;
- diluting the concentrated sodium hydroxide solution with dilution water at a dilution ratio of at least about 100-to-1 by volume to produce the diluted sodium hydroxide solution; and
- dispensing the diluted sodium hydroxide solution.

17. The method of claim 16, and further comprising deionizing tap water into a deionizing cartridge to produce the deionized water.

18. The method of claim 17, wherein the dilution water is not obtained from the deionizing cartridge.

19. The method of claim 16, wherein the dilution ratio is at least about 250-to-1 by volume.

20. The method of claim 16, wherein the non-chlorinated electrolyte is selected from the group consisting of sodium bicarbonate, sodium carbonate, and combinations thereof.

* * * * *